United States Patent Office 3,467,638
Patented Sept. 16, 1969

3,467,638
FLUORINATED CURE-SITE MONOMERS AND VULCANIZABLE FLUOROCARBON POLYMERS MADE THEREWITH
Dexter Brayton Pattison, Wilmington, Del., assignor to E. I. du Pont de Nemours and Company, Wilmington, Del., a corporation of Delaware
No Drawing. Filed Mar. 7, 1967, Ser. No. 621,122
Int. Cl. C08f 15/02; C07c 43/26, 51/58
U.S. Cl. 260—87.5  5 Claims

ABSTRACT OF THE DISCLOSURE

Monomers of the formula:

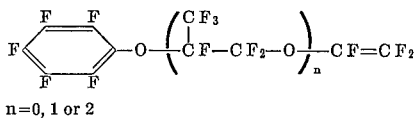

n=0, 1 or 2 can be prepared in high yield by reacting cesium perfluorophenoxide with hexafluoropropylene epoxide and pyrolyzing the intermediate acid fluorides. The monomers where $n$ is 1 or 2 can be copolymerized readily with other vinyl type monomers and vulcanized by treatment with aliphatic diamines or hydrazine.

Background of the invention

This invention relates to novel fluorocarbon compounds useful for making polymerizable monomers, to certain monomers derived therefrom and to vulcanizable fluorinated polymers prepared by copolymerization of said monomers with other fluorine containing monomers.

Octafluorovinylphenylther has been taught by Wall and Plummer in U.S. Patent 3,192,190. This monomer is made in low yield by the action of alkali metal phenoxide on tetrafluoroethylene. Homopolymers of octafluorovinylphenylether can be made by irradiation of the monomer with α-radiation. Attempts to form copolymers of this material with other fluorine containing monomers have, however, proved unsuccessful.

Description of the invention

The present invention includes novel compounds prepared by the reaction of cesium or potassium perfluorophenoxides, with from 2 to 3 moles of hexafluoropropylene epoxide in the presence of an inert aprotic polar organic solvent and can be described by the formula:

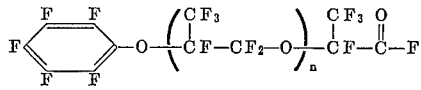

The novel intermediates can be converted readily to other derivatives such as the acid or alkali metal salts.

Pyrolysis of the novel intermediates at 100° C. to 200° C. result in novel monomers having the formula:

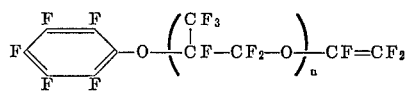

wherein $n$ has the same meaning as above. These monomers can be copolymerized by conventional methods with fluorine-containing vinyl monomers such as vinylidene fluoride, hexafluoropropene, tetrafluoroethylene and perfluoro(alkyl vinyl ethers) to form useful, vulcanizable plastics and elastomers.

Perfluorophenol and its alkali metal salts are known compounds and are described for example by Wall et al. in the Journal of Research of the National Bureau of Standards A. Physics and Chemistry, vol. 67A, pages 481–497 (1963). In the process of the present invention the cesium salts are preferred, but potassium salts are operable.

Hexafluoropropylene epoxide is also a known compound and can be made by the action of alkaline hydrogen peroxide on perfluoropropylene at a temperature of about 30° C.

The solvents employed to react the cesium perfluorophenoxide and hexafluoropropylene epoxide are aprotic polar organic solvents of which the lower alkyl ethers of ethylene glycol, diethylene glycol, triethylene glycol, and tetraethylene glycol are preferred. Other suitable aprotic polar solvents include furan, dioxane, benzonitrile, acetonitrile, dimethyl acetamide, and the like. Other suitable aprotic polar solvents will occur to one skilled in the art.

Reaction temperature may be varied greatly from as low as —80° C. to 200° C. depending on the physical constants of the solvent. The preferred temperature range is from —30° to 100° C.

Pressure can range from below atmospheric pressure to several hundred atmospheres, and is not critical.

The product of the reaction is generally a mixture containing compounds of the formula:

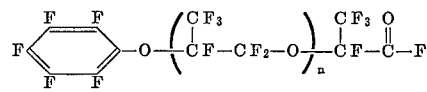

wherein $n$ is from 0, 1, or 2. These compounds can be separated from the solvent, and from each other, by distillation.

The novel intermediates thus obtained can be pyrolyzed at 100° C. to 250° C. to give fluorocarbon ether monomers.

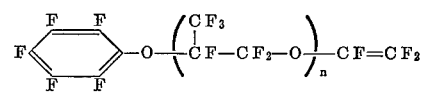

when $n=0$ the monomer of the U.S. Patent 3,192,190 is obtained in high yield.

The acid fluoride intermediates, or a derivation thereof, such as the acid or its alkali metal salts, can be pyrolyzed alone or in the presence of high boiling polar or non-polar aprotic solvents, such as tetraethylene glycol dimethyl ether or diphenyl, to effect heat transfer.

The above novel monomers can be copolymerized with a variety of ethylenic monomers. Preferably fluorine containing monomers are employed to produce chemically inert fluorocarbon plastics and elastomers which can subsequently be crosslinked by reaction of perfluorophenyl groups with aliphatic diamines or hydrazine.

Examples of such monomers are tetrafluoroethylene vinylidene fluoride, chlorotrifluoroethylene, hexafluoropropylene, $CF_3$—$CH=CF_2$, $CF_3$—$CF=CHF$, and perfluoroalkyl perfluorovinyl ethers, preferably containing from 3 to 8 carbon atoms, as described in U.S. Patent 3,180,895 and the like.

A wide variety of methods of making such polymers will be apparent to those skilled in the art. One method employs aqueous media and free radical initiators at slightly elevated temperatures, e.g. 40° C., and pressures of the order of 120 p.s.i. Alternately bulk or solution processes can be employed.

Preferably the polymers contain a minor percentage of the novel monomers of this application which then confer vulcanizability on the polymers.

Vulcanization is accomplished by reaction of the polymers with an aliphatic diamine, generally containing from 2 to 20 carbon atoms and generally in the presence of other compounding ingredients such as carbon black, magnesium oxide and the like.

This invention is further illustrated by the following specific examples which should not, however, be construed as fully delineating the scope of this discovery.

Example 1.—Preparation of tetrafluoro-2-(pentafluorophenoxy) propionyl fluoride

Cesium perfluorophenoxide is prepared by the reaction of pentafluorophenol and cesium carbonate by the following procedure:

In a 1000 ml. 4-necked flask fitted with a mechanical stirrer, a reflux condenser, dropping funnel, under nitrogen, there is put 178 g. of cesium carbonate and 330 ml. of bis-(2-methoxyethyl)ether. The mixture is heated to 90° C. with stirring and a solution of 74.8 g. of pentafluorophenol in 80 ml. bis-(2-methoxyethyl)ether is added dropwise over 30 minutes. The mixture is heated 3 hours at 90–100° C., and cooled to room temperature. Solids are separated by filtration under nitrogen and the solids rinsed with 100 ml. of bis-(2-methoxyethyl) ether. The combined filtrate is evaporated to dryness in a spinning flask, finishing half an hour at 150° C. under 0.5 mm. pressure. The yield of cesium perfluorophenoxide is 118 g. (92% of the theoretical yield).

Tetrafluoro-2-(pentafluorophenoxy) propionyl fluoride is prepared by the reaction of cesium perfluorophenoxide with hexafluoropropylene oxide.

In a 500 ml. 3-necked flask fitted with a Dry Ice cooled reflux condenser, dropping funnel, mechanical stirrer, and thermometer, under nitrogen and connected to a weighed cylinder containing hexafluoropropylene oxide, here is put 118 g. of cesium perfluorophenoxide and 150 ml. of 2,5,8,11,14-pentaoxopentadecane, purified by redistillation at 1 mm. pressure from lithium aluminum hydride. The mixture is heated to about 50° C. until all solids dissolve and then cooled to 10° C. With stirring at 10°±2° C., hexafluoropropylene oxide gas is added continuously at a rate to maintain moderate reflux. During 2.2 hours, 89.2 g. of hexafluoropropylene oxide (1.45 moles per mole of cesium) are added. At this point addition of hexafluoropropylene is stopped. After sitting half an hour, the mixture is distilled under reduced pressure. The yield is 136 g. (90% of the theoretical yield), mostly boiling at 48° C. to 55° C. under 3 mm. pressure, but with some higher boiling material. Distillation is stopped when 2,5,8,11,14-pentaoxapentadecane comes over as an upper layer, separating from the product. The theoretical yield is calculated on the basis that the product is 55% tetrafluoro-2-(pentafluorophenoxy) propionyl fluoride, and 45% tetrafluoro-2-[hexafluoro-2-(pentafluorophenoxy) propoxy] propionyl fluoride, based on the use of 1.45 moles of hexafluoropropylene oxide.

The mixed fluorides show the following analyses: Calc'd for $C_9F_{10}O_2$: C, 32.8; H, 0.0; F, 57.6; mol. wt. 330. Calc'd for $C_{12}F_{16}O$: C, 29.0; H, 0.0; F, 61.3; mol. wt. 496. Found: C, 31.9; H, 0.2; F, 57.2; mol. wt. 4000 by IR spectra.

Example 2.—Preparation of perfluorophenyl perfluorovinyl ether

Perfluorophenyl perfluorovinyl ether is prepared by the reaction of tetrafluoro-2-(pentafluorophenoxy) propionyl fluoride with sodium carbonate.

In a 1000 ml. 4-necked flask fitted with a mechanical stirrer, a dropping funnel with a tip extended near the middle of the flask, a distilling head, and thermometers to measure both vapor and liquid temperatures, there is put 125 g. of sodium carbonate. This is heated while sweeping with nitrogen to remove water. After cooling, 300 ml. of bis-(2-ethoxyethyl)ether is added. The mixture is heated, and about 100 ml. of distillate is collected and discarded. Next 130.6 g. of the mixed perfluorophenyl propionyl fluorides made in Example 1 is added dropwise over 70 minutes, maintaining 175–180° C. pot temperature and 165–170° C. head temperature. Heating is continued one half hour longer until the pot temperature is 190° C. and the head temperature 187° C.

To the crude product 150 ml. of water is added, and the mixture is distilled at atmospheric pressure, returning the upper water layer to the pot, and collecting the lower layer as product. Two fractions are obtained, cut 1, B.P. 90–95° C., weight 42 g., and cut 2, B.P. 95–100° C. weight 37 g. By vapor phase chromatography (VPC), cut 1 is about 93.8% perfluorophenyl perfluorovinyl ether and 1.6% bis-(2-ethoxyethyl) ether. Cut 2 is a mixture of about 54.6% perfluorophenyl perfluorovinyl ether; about 37.2% of the next higher homologue, hexafluoro-2-(pentafluorophenoxy)-1-(trifluorovinyloxy) propane, and about 6.9% of bis-(2-ethoxyethyl) ether.

Cut 1 shows the following analysis: Calc'd for $C_8F_8O$: C, 36.3; H, 0.0; F, 57.6. Found: C, 36.1; H, 0.2; F, 58.3.

Example 3.—Preparation of hexafluoro-2-(pentafluorophenoxy)-1-(trifluorovinyloxy) propane This ether is prepared by fractional distillation of cut 2 of Example 2. Fractions from two runs are combined and distilled five times with an excess of water through a 2 ft. Vigreaux column. The product boiling at 98° C. as a water azeotrope is mostly hexafluoro-2-(pentafluorophenoxy)-1-trifluorovinyloxy propane as determined by VPC. At this stage the bis-(2-ethoxyethyl) ether content is 0.4% by VPC. Redistillation of 20.9 g. of the ether (without water) and analysis by VPC shows the following:

| Calc'd for— | $C_{14}F_{20}O_3$ | Cut 1 (discarded) | Cut 2 | Cut 3 |
|---|---|---|---|---|
| Boiling pt. ° C. at 16 mm. press | | 73–76 | 76 | 76 |
| Weight g | | 1.3 | 9.2 | 8.6 |
| Percent C | 28.2 | 30.6 | 30.5 | 30.3 |
| Percent H | 0 | 0.1 | 0.1 | 0.1 |
| Percent F | 63.8 | 62.2 | 63.4 | 63.3 |
| Percent $C_6F_5OC_3F_6OCF_2CF_2H$ | | | 19.5 | 21.8 |
| Percent $C_6F_5OC_3F_6OCF=CF_2$ | | | 77.2 | 77.2 |
| Percent unidentified | | | 3.4 | 1.0 |

NOTE.—Cuts 2 and 3 are mainly hexafluoro-2-(pentafluorophenoxy)-1-(trifluorovinyloxy) ether, with hexafluoro-2-(pentafluorophenoxy)-1-(2H-tetrafluoroethoxy) propane as the major impurity.

Example 4.—Preparation of hexafluoro-2-(pentafluorophenoxy) propyl trifluoro - 1 - trifluoromethyl-2 - (trifluorovinyloxy) ethyl ether Except as shown below, this preparation follows the processes of Examples 1 and 2.

Cesium pentafluorophenoxide is prepared in a 2 liter flask, containing 518 g. of cesium carbonate and 940 ml. 2,5,8,11,14-pentaoxapentadecane, by adding dropwise over 30 minutes at 90° C., a solution of 240 g. pentafluorophenol in 150 ml. of 2,5,8,11,14 - pentaoxapentadecane. The mixture is heated 3 hours at 90–100° C., let cool to room temperature and filtered. The filtrate, weighing 1504 g., is stored under nitrogen.

To prepare acid fluorides of formula,

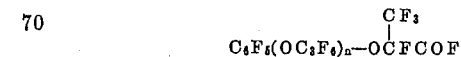

where $n=1.45$ as described in Example 1, one fifth of the above cesium pentafluorophenoxide solution is distilled at 1 mm. pressure until 138 ml. of 2,5,8,11,14-pentaoxapentadecane comes over. The residue is calculated to contain 78.2 g. of $C_6F_5OCs$ (0.247 mole) and 82.4 g. of 2,5,8,11,14-pentaoxapentadecane. This solution is placed in a 500 ml., 4-necked flask fitted with a mechanical stirrer, Dry Ice cooled reflux condenser, and a nitrogen and vacuum source. A weighed hexafluoropropylene oxide cylinder is connected to the flask which is flushed twice with vacuum and nitrogen. Keeping the temperature at 0° to 2° C., 48 g. of hexafluoropropylene oxide is added over one hour, then the temperature is raised to 15° C. Over 5.5 hours total time, 97 g. of hexafluoropropylene oxide (2.36 moles per mole of $C_6F_5OCs$) is added.

The mixture is distilled rapidly through a 2 foot Vigreaux column to yield 128 g. of crude perfluorophenoxypropoxypropionyl fluoride, with an upper layer of 20 ml. of 2,5,8,11,14-pentaoxapentadecane.

Vinyl ethers are prepared by the reaction of the above crude perfluorophenoxypropoxypropionyl fluoride with sodium carbonate, as follows:

In a 500 ml. flask fitted as in Example 2 is put 50 g. of sodium carbonate and 120 ml. of 2,5,8,11-tetraoxadodecane. The mixture is heated until 20 ml. of distillate is obtained. This distillate is discarded. Next the 128 g. of the crude perfluorophenoxypropoxypropionyl fluoride described above is added dropwise over 40 minutes at 195°±2° C. flask temperature, simultaneously collecting about 50 ml. of distillate of mixed perfluorophenoxyalkoxy vinyl ethers. The mixture is heated 1.5 hours longer until the total distillate is about 100 ml. The weight is 132 g. The crude product is mixed with 150 ml. of water and distilled using a water separator, returning the upper water layer to the distillation flask. The yield is 77 g. of mixed perfluoro-phenoxyalkoxy vinyl ethers (63% overall yield based on perfluorophenol for three reactions).

A 74 g. sample is distilled with water through a 2 ft. Vigreaux column. Cut 1, B.P. 89–97° C., is mostly perfluorophenyl perfluorovinyl ether. Cut 2, weight 22.0 g., B.P. 97–98° C. and cut 3, B.P. 98–99° C., weight 19.8 g., are combined and separated by preparative vapor phase chromatography. From 34 g., using two passes through the preparative VPC unit, 4.5 g. of 97% pure hexafluoro-2-(pentafluorophenoxy)-1-(trifluorovinyloxy) propane, $C_6F_5OC_3F_6OCF=CF_2$, is obtained. Calc'd for $C_{11}F_{14}O_2$: C, 30.7; H, 0.0. Found: C, 30.7; H, 0.0. The pure ether has strong infrared absorption bands at 7.00 and 11.13 microns. A strong infrared absorption at 5.45 microns is characteristic for these perfluorovinyl ethers including perfluoro-methyl vinyl ether, perfluoro-propyl vinyl ether, and perfluorophenyl perfluorovinyl ether.

From the preparative VPC separation, there is obtained 1.8 g. of hexafluoro-2-(pentafluorophenoxy)-1-(2H-tetrafluoroethoxy)propane, $C_6F_5OC_3F_6OCF_2CF_2H$. Calc'd for $C_{11}F_{15}O_2H$: C, 29.3; H, 0.22. Found: C, 29.6; H, 0.3. The purity by VPC is 95.5%. This compound shows no infrared absorption band at 5.45 microns, but has strong infrared absorption peaks at 7.00 microns and 11.13 microns. This infrared absorption structure is similar to that of other hydrogen fluoride adducts of perfluorinated vinyl ethers.

From the preparative VPC separation, there is obtained 1.8 g. of hexafluoro-2-(pentafluorophenoxy) propyl trifluoro-1-trifluoromethyl-2-(trifluorovinyloxy) ethyl ether, $C_6F_5(OC_3F_6)_2OCF=CF_2$. Calc'd for $C_{14}F_{20}O_3$: C, 28.2; H, 0.0. Found: C, 28.2; H, 0.1. The purity by VPC is 100%. As expected, this ether has a strong infrared absorption band at 5.45 microns, and shows no infrared absorption bands at 7.00 and 11.13 microns.

Another component from the preparative VPC separation is 0.7 g. of the HF adduct of this ether, $C_6F_5OC_3F_6OC_3F_6OCF_2CF_2H$. Calc'd for $C_{14}F_{21}O_3H$: C, 27.3; H, 0.16. Found: C, 28.1; H, 0.3. The purity by VPC is 96%. This compound was not distilled by trap to trap distillation after separation by preparative VPC and therefore the carbon and hydrogen analyses are not exact. As expected, this compound has strong infrared absorption bands at 7.00 and 11.13 microns but no infrared absorption at 5.45 microns.

Example 5.—Preparation of a copolymer of hexafluoro-2-(pentafluorophenoxy) - 1 - (trifluorovinyloxy) propane, perfluoromethyl perfluorovinyl ether, and tetrafluoroethylene This example shows that this new ether copolymerizes readily with perfluoromethyl perfluorovinyl ether and tetrafluoroethylene. For use in polymerization the perfluorophenoxypropyl perfluorovinyl ether, is washed twice with an equal volume of water to remove any traces of 2,5,8,11-tetraoxadodecane. The material is redistilled through a Vigreaux column, and low boiling material, containing less than 50% of the desired vinyl ether by VPC, is rejected. The remainder, typically containing about 58% hexafluoro - 2 - (pentafluorophenoxy) - 1 - (trifluorovinyloxy) propane, and 34% of hexafluoro-2-(pentafluorophenoxy) - 1 - (2H-tetrafluoroethoxy) propane, and no perfluorophenyl perfluorovinyl ether, is used as described below.

In a 1-liter stainless steel autoclave thoroughly flushed with nitrogen and then with gaseous perfluoromethyl perfluorovinyl ether is charged 346 ml. of phosphate solution (prepared by dissolving 76 g. of $Na_2HPO_4 \cdot 7H_2O$ and 4 g. $NaH_2PO_4 \cdot H_2O$ in 1930 ml. $H_2O$); 1554 ml. of distilled and deaerated water; 15 g. of ammonium perfluorooctanoate, and 2 g. of ammonium persulfate. The contents of the autoclave are stirred and maintained at 50° C. and 140 p.s.i.g. pressure during a 5-hour run. Pressure is first raised to 140 p.s.i.g., by metering over a 30-minute period perfluoromethyl perfluorovinyl ether and tetrafluoroethylene at rates of 234 g./hr. and 94 g./hr., respectively, as gaseous monomers. Liquid hexafluoro-2-(pentafluorophenoxy)-1-(trifluorovinyloxy) propane, 7.6 g., is introduced during the same period by a screw injector. Near the start of the run, 50 ml. of sulfite solution (prepared by dissolving 0.07 g. $CuSO_4 \cdot 5H_2O$ and 9 g. $Na_2SO_3$ in 900 ml. distilled deaerated $H_2O$) is pumped into the autoclave, and during the run 10 ml. of the sulfite solution are added each hour. The pressure is then maintained at 140 p.s.i.g. by adjusting the gas flow rates or by addition of the sulfite solution. Typically, during the run perfluoromethyl perfluorovinyl ether is charged at the rate of 50 g./hr.; tetrafluoroethylene at the rate of 45 g./hr.; and the new ether at the rate of 3.23 g./hr. During the 5 hours at 140 p.s.i.g., 432 g. of monomers are added. After the run, there are 14.0 liters of off gas at 25° C. and atmospheric pressure. The copolymer latex weighs 2404 g. and has a pH of 6. The solid copolymer is coagulated by freezing the latex in a Dry Ice-acetone mixture, warmed to room temperature, filtered from the liquid, and washed twice with water in a Waring blender. The polymer is put in a 5-liter 3-necked flask with a mechanical stirrer, water separator, and reflux condenser and is heated at reflux with about 2 liters of water until no more lower layer comes over. The yield of liquid water-insoluble distillate is 2.2 g. The polymer was filtered, washed with water, and dried to constant weight at room temperature and on a 2-roll rubber mill at 100° C. The yield of solid elastomer is 353 g. It has an inherent viscosity of 0.78 measured at 30° C. in 2,3-dichloroperfluorobutane at a concentration of 0.1 g. per 100 ml. of solvent. A thin pressed film shows a strong infrared absorption band at 6.55 microns (characteristic of the perfluorophenoxy group), a weaker infrared absorption band at 10.00 microns (characteristic of the perfluoropropoxy ether group),

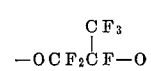

and a strong infrared absorption band at 11.25 microns (characteristic of the perfluoromethoxy group).

The copolymer of this example is compounded on a 2-roll rubber mill according to the following weight proportions:

|  | A | B |
|---|---|---|
| Copolymer | 100 | 100 |
| Medium thermal carbon black | 20 | 20 |
| Magnesium oxide | 15 | 15 |
| p-Phenylene diamine | 1 |  |
| Tetraethylene pentamine |  | 1 |

The compositions are molded under pressure for 30 minutes at 160° C. by conventional compression molding techniques into sheets and pellets which are suitable for use in physical testing. The sheets are post cured in an air oven for 24 hours at 204° C. to complete vulcanization, and the pellets are post cured 1 day at 120° C., 1 day at 140° C., 1 day at 160° C., 3 days at 180° C., and 1 day at 204° C.

| Properties measured at 25° C. | A | B |
|---|---|---|
| Tensile strength, p.s.i. | 1,600 | 1,950 |
| Elongation at break, percent | 205 | 280 |
| Hardness, Durometer A | 82 | 80 |
| Percent volume increase in 2,3-dichloroperfluorobutane (7 days) | 326 | 161 |
| Compression set, 70 hrs. 121° C., percent | 55 | 59 |

The unvulcanized elastomer is completely soluble in 2,3-dichloroperfluorobutane. The vulcanized elastomers swell but do not dissolve in this solvent.

Example 6.—Alternate preparation of a copolymer of hexafluoro - 2 - (pentafluorophenoxy) - 1 - (trifluorovinyloxy) propane, perfluoromethyl perfluorovinyl ether, and tetrafluoroethylene The following materials are charged under nitrogen to a 400 ml. stainless steel shaker tube:

| | |
|---|---|
| Hexafluoro - 2 - (pentafluorophenoxy) - 1 - (trifluorovinyloxy) propane _____ g__ | 3.0 |
| Ammonium perfluorooctanoate _____ g__ | 1.0 |
| Potassium persulfate _____ g__ | 0.95 |
| $Na_2HPO_4 \cdot 7H_2O$ _____ g__ | 2.5 |
| 0.01% copper sulfate solution _____ ml__ | 1 |
| Distilled deaerated water _____ ml__ | 99 |
| Sodium sulfite _____ g__ | 0.2 |

The shaker tube is closed, cooled in Dry Ice-acetone, and evacuated. From separate cylinders 37.2 g. of perfluoromethyl perfluorovinyl ether and 15.2 g. of tetrafluoroethylene are added to the cold shaker tube. The tube is heated with agitation for 8 hrs. at 50° C. Unreacted monomer, recovered by the method of Example 5 is 0.31 g.; and the yield of polymer is 23 g. A pressed film shows in the infrared spectrum the perfluorophenyl ether absorption at 6.55 microns, the perfluoropropyl ether absorption at 10.00 microns, and the perfluoromethyl ether absorption at 11.25 microns.

The copolymer of this example is vulcanized by the method of Example 5, except that 1.5 parts of hexamethylene diamine carbamate is used as the curing agent.

Vulcanizate properties are measured after post curing for 1 day at 204° C.

| | |
|---|---|
| Tensile strength, 25° C. _____ p.s.i.__ | 1800 |
| Elongation at break _____ percent__ | 160 |
| Hardness, Durometer A _____ | 85 |
| Volume increase in 2,3-dichloroperfluorobutane, 1 day _____ percent__ | 187 |

Example 7.—Preparation of a copolymer of hexafluoro-2-(pentafluorophenoxy) propyl trifluoro-1-trifluoromethyl-2-(trifluorovinyloxy) ethyl ether, perfluoromethyl perfluorovinyl ether, and tetrafluoroethylene This copolymer is prepared by the method of Example 6, except that the fluorinated monomers are:

| | |
|---|---|
| Hexafluoro-2-(pentafluorophenoxy) propyl trifluoro-1 - trifluoromethyl - 2 - (trifluorovinyloxy) ethyl ether _____ G. | 3.0 |
| Perfluoromethyl perfluorovinyl ether _____ | 36 |
| Tetrafluoroethylene _____ | 14.5 |

For use in polymerizations, the new ether is washed three times with water to remove any traces of 2,5,8,11-tetraoxadodecane. Typically, if 182 gm. of the ether is washed with three 300 ml. portions of $H_2O$, the product yield at 170 gm., and analyzes by VPC 63.1%

$$C_6F_5OC_3F_6OC_3F_6OCF{=}CF_2$$

34.7% $C_6F_5OC_3F_6OC_3F_6OCF_2CF_2H$, and 2.1%

$$C_6F_5OC_3F_6OCF_2CF_2H$$

The yield of copolymer is 27.1 g., with 1.04 g. of recovered monomer. The inherent viscosity of the copolymer in 2,3-dichloroperfluorobutane as solvent is 0.92 (72% soluble).

As many widely different embodiments of this invention may be made without departing from the spirit and scope thereof, it is to be understood that this invention is not limited to the specific embodiments thereof except as defined in the appended claims.

I claim:
1. Compounds having the formula

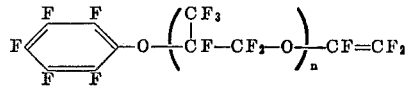

when $n=1$ or 2.

2. A copolymer of a minor amount of

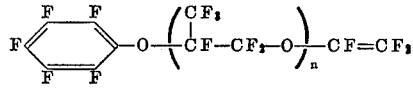

when $n$ is 1 or 2 with at least one fluorine-containing ethylenic monomer.

3. Copolymer of claim 2 wherein said fluorine containing ethylenic monomers are perfluoromethyl perfluorovinyl ether and tetrafluoroethylene.

4. The cured copolymer of claim 2.
5. The cured copolymer of claim 3.

References Cited

UNITED STATES PATENTS

| 3,192,190 | 4/1965 | Wall _____ 260—91.1 |
| 3,180,895 | 4/1965 | Harris et al. _____ 260—614 |
| 3,114,778 | 12/1963 | Fritz et al. _____ 260—614 |

JOSEPH L. SCHOFER, Primary Examiner

JOHN A. DONAHUE, Jr., Assistant Examiner

U.S. Cl. X.R.

260—544, 613